(12) United States Patent
Wei

(10) Patent No.: US 7,167,518 B2
(45) Date of Patent: Jan. 23, 2007

(54) BANDWIDTH-EFFICIENT MODULATION IN COMMUNICATION SYSTEMS

(75) Inventor: Lee-Fang Wei, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/133,097

(22) Filed: May 19, 2005

(65) Prior Publication Data

US 2005/0213675 A1   Sep. 29, 2005

Related U.S. Application Data

(62) Division of application No. 09/758,958, filed on Jan. 11, 2001.

(60) Provisional application No. 60/254,181, filed on Dec. 8, 2000.

(51) Int. Cl.
*H04B 1/66* (2006.01)

(52) U.S. Cl. ............... 375/240; 375/263; 375/290; 375/298; 341/52; 341/68

(58) Field of Classification Search ................ 375/268, 375/286, 287, 290, 291, 316, 320, 340, 350; 455/63, 67.1, 67.3, 226.1, 226.2, 296, 308
See application file for complete search history.

(56) References Cited

U.S. PATENT DOCUMENTS 3,388,330 A    6/1968  Kretzmer .................... 325/42
5,311,547 A    5/1994  Wei .............................. 375/18
5,543,952 A    8/1996  Yonenaga et al. ........... 359/181
5,867,534 A    2/1999  Price et al. ................... 375/286
6,366,418 B1   4/2002  McEwen et al. .............. 360/48
6,426,821 B1   7/2002  Price et al. ................... 359/156
6,744,827 B1*  6/2004  Vandenabeele et al. ..... 375/320
6,879,645 B1*  4/2005  Webber et al. ............... 375/317

OTHER PUBLICATIONS

Howson, R.D. *IEEE Trans Commun Technol, Com*, "An Analysis of the Capabilities of Polybinary Data", pp. 312-319, 1965.
Kretzmer, E.R. *IEEE Communications Convention*, "Binary Data Communication By Partial Response Tran", pp. 451-455, 1965.
B. Sklar, *Digital Communications Fundamental and Applications*, Formatting and Baseband Transmission, pp. 51-116, 1988.
Ono T et al: "*Characteristics of Optical Duobinary Signals in Terabit/S Capacity, High-Spectral Eficiency WDM Systems*" Journal of Lightwave Technology, vol. 16, No. 5 (May 1998) pp. 788-797.
Wei, Fang-Lee: "*Precoding Technique for Partial-Response Channels With Applications to HDTV Transmission*" IEEE Journal on Selected Areas in Communications, vol. 11, No. 1 (1993) pp. 127-135.
Yonenaga K et al: *Dispersion-Tolerant Optical Transmission System Using Duobinary Transmitter and Binary Receiver* Journal of Lightwave Technology, vol. 15, No. 8 (Aug. 1997) pp. 1530-1537.

* cited by examiner

*Primary Examiner*—Dac V. Ha
(74) *Attorney, Agent, or Firm*—John F. McCabe

(57) ABSTRACT

A transmitter of digital data includes a modulator with an input for a carrier signal and an input for a first stream of control symbols. The modulator modulates the carrier signal with a second stream of symbols produced by the modulator. Each symbol of the second stream has a value that corresponds to a sum of the present control symbol and the last K first symbols of the first stream. The integer K is greater than one.

13 Claims, 9 Drawing Sheets

| Digital Filter | Normalized Signal Bandwidth* | Loss in Receiver Sensitivity (dB)* | Number of Transmitter Signal Amplitudes $Q_n$ | Number of Receiver Signal Amplitudes $Q_n^2$ |
|---|---|---|---|---|
| $1 + Z^{-1}$ (duobinary) | $\frac{1}{2}$ | 0 | 3 | 2 |
| $1 + Z^{-1} + Z^{-2} + Z^{-3}$ | $\frac{1}{4}$ | 3 | 5 | 3 |
| $1 + \sum_{i=1}^{5} Z^{-i}$ | $\frac{1}{6}$ | 4.8 | 7 | 4 |
| $1 + \sum_{i=1}^{7} Z^{-i}$ | $\frac{1}{8}$ | 6 | 9 | 5 |
| ... | ... | ... | ... | ... |
| $1 + \sum_{i=1}^{15} Z^{-i}$ | $\frac{1}{16}$ | 9 | 17 | 9 |

*Relative to a baseline on/off NRZ modulation.

FIG. 9

BANDWIDTH-EFFICIENT MODULATION IN COMMUNICATION SYSTEMS

This is a divisional of application Ser. No. 09/758,958 filed on Jan. 11, 2001, which claims the benefit of U.S. Provisional Application No. 60/254,181 filed Dec. 8, 2000.

BACKGROUND OF THE INVENTION

This invention relates to communication systems and, more particularly, to modulation methods for communication systems.

Wavelength division multiplexing (WDM) is a communication scheme that allocates different spectral bands as independent communication channels. For optical transmissions over optical fibers, the allocated bands are typically spectrally adjacent and located in a spectral range for which silica-glass optical fibers provide low attenuation and/or low dispersion. The total spectral range includes wavelengths between about 1.35 microns and 1.7 microns. In WDM systems, one limitation on the bandwidth of the individual bands is cross-channel interference (CCI). The bands cannot be so broad that communications on one channel interferes with and causes errors in communications on adjacent channels.

Together CCI and the physical properties of silica-glass fibers limit the number of independent channels available to optical systems that implement WDM. As data transmission rates increase, CCI between spectrally adjacent channels also tends to increase. Future transmission rates of optical WDM systems could increase if better methods were available for reducing or handling CCI.

SUMMARY OF THE INVENTION

Various embodiments provide modulation schemes that produce carrier waves with narrower spectral widths than conventionally modulated carrier waves transmitting at the same symbol rate. The spectral widths are decreased by increasing interference between symbols that represent successive data values. The intersymbol interference has a known form that a receiver exploits to recover the transmitted data values from the carrier wave.

In one embodiment, the invention features a method for transmitting a stream of successive digital data values. The method includes modulating a carrier wave to carry symbols representative of successive ones of the digital data values. The symbols representative of successive data values interfere more in the modulated carrier wave than in a reference wave that transmits symbols at the same rate as the modulated carrier wave. The reference wave is produced by modulating the same carrier wave with one of the symbols at a time. The modulated carrier wave has a narrower spectral width than the reference wave and an effective symbol rate that is more than two times smaller than the effective symbol rate of the reference wave.

In another embodiment, the invention features a transmitter of digital data having a modulator configured to use a non-return-to-zero (NRZ) waveform. The modulator has an input for a carrier signal and an input for a first stream of control symbols. The modulator modulates the carrier signal with a second stream of symbols produced by the modulator. Each symbol of the second stream has a value that corresponds to a sum of the present control symbol and the last K control symbols of the first stream. The integer K is greater than one.

In another embodiment, the invention features a method of transmitting a stream of symbols representative of digital data values. The method includes processing the symbols with a partial response function defined by $[1+\Sigma^{K}_{i=1}Z^{-i}]$ and modulating a carrier wave with the processed symbols. Here, the integer K is greater than one, and the functions $Z^{-i}$ delay the data symbols by i times the time between successive ones of the data symbols.

In another embodiment, the invention features a receiver. The receiver includes a detector to determine a sequence of values representative of amplitudes of a received carrier wave and an inverse constellation mapper to estimate a sequence of input digital data values. The mapper estimates the sequence based both on the sequence of determined values from the amplitude detector and on a relation between amplitudes of a symbol constellation and the input digital data values that modulated the carrier wave. The relation associates at least two amplitudes of the constellation to the same value of an input digital data value.

BRIEF DESCRIPTION OF THE DRAWINGS

FIG. 9 lists transmission bandwidths and receiver sensitivities for several values of the integer K that characterizes the digital filter of FIG. 1.

In various Figures like reference numbers indicate like features.

DETAILED DESCRIPTION

As digital data rates increase, modulation symbol rates of a carrier wave are typically increased to accommodate the increased data rate. Increasing the modulation symbol rate broadens the spectral width of a modulated carrier wave. This broadening is problematic in WDM systems where adjacent wavelength bands function as separate communication channels, because the broadening increases cross-channel interference (CCI).

To reduce CCI, the embodiments provide modulation schemes that decrease an "effective" modulation symbol rate with respect to those of conventional modulation schemes. In the new modulation schemes, the "effective" modulation symbol rate determines spectral widths of modulated carrier waves and is lower than the data transmission rate. The "effective" modulation symbol rate is decreased by increasing intra-channel interference (ICI) between symbols transmitting independent digital data values.

Herein, the "effective symbol rate" is the inverse of the time that a symbol representative of one input digital data value in a stream of input digital data contributes to the waveform used to modulate the carrier wave for the digital data. Each input digital data value may include a single or multiple bits.

Figure 1:
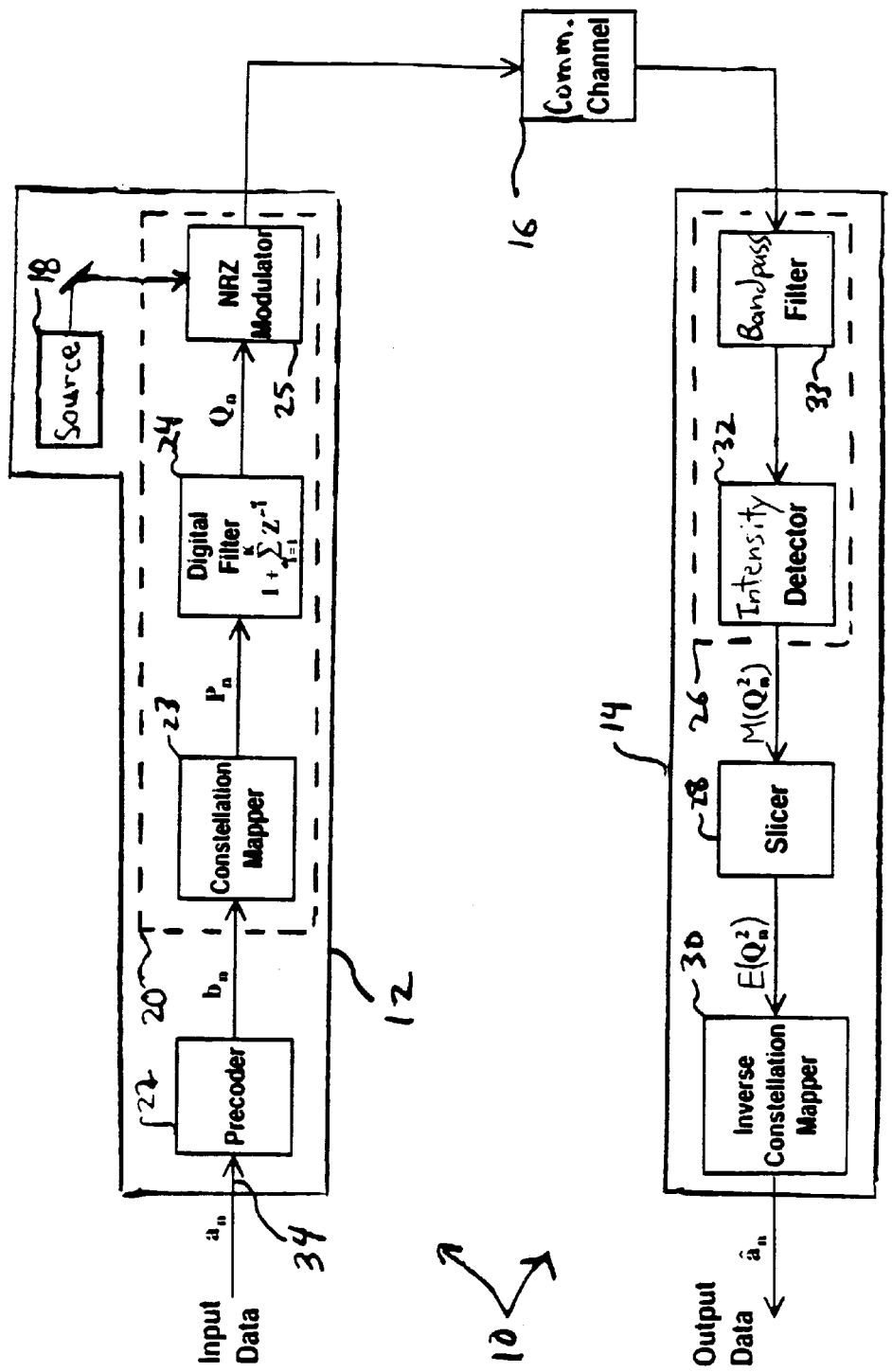
FIG. 1 is a block diagram of a communication system.

FIG. 1 is a block diagram showing a communication system 10 for transmitting digital data. The system 10 includes a transmitter 12, a receiver 14, and a communication channel 16 that couples the transmitter 12 to the receiver 14.

The transmitter 12 includes a source 18, a modulator 20 and a precoder 22. The modulator 20 includes a constellation mapper 23, a digital filter 24, and a NRZ modulator 25. The modulator 20 modulates a carrier wave from the source 18 so that the carrier wave carries a stream of input data bits $a_n$. The modulator 20 transmits the modulated wave to the communication channel 16.

Herein, an NRZ modulator modulates a carrier wave with a NRZ waveform having an amplitude representative of the sequential values of a sequence of control symbols.

The receiver 14 includes a received signal detector 26, a slicer 28, and an inverse constellation mapper 30. The received signal detector 26 includes a bandpass filter 33 and an intensity detector 32, i.e., a detector responsive to the instantaneous energy of the received signal. The inverse constellation mapper 30 produces a stream of estimated data bits $\hat{a}_n$ based on the received signal from the communication channel 16.

In various embodiments, system 10 provides for optical communication, e.g., in a optical WDM system. In these embodiments, channel 16 includes an optical fiber, source 18 is a laser, filter 33 is an optical filter, and detector 32 is an optical intensity detector.

In other embodiments, system 10 is a wire or wireless communication system and source 18 is a radio-wave generator or a high-frequency voltage source, respectively.

Figure 2:
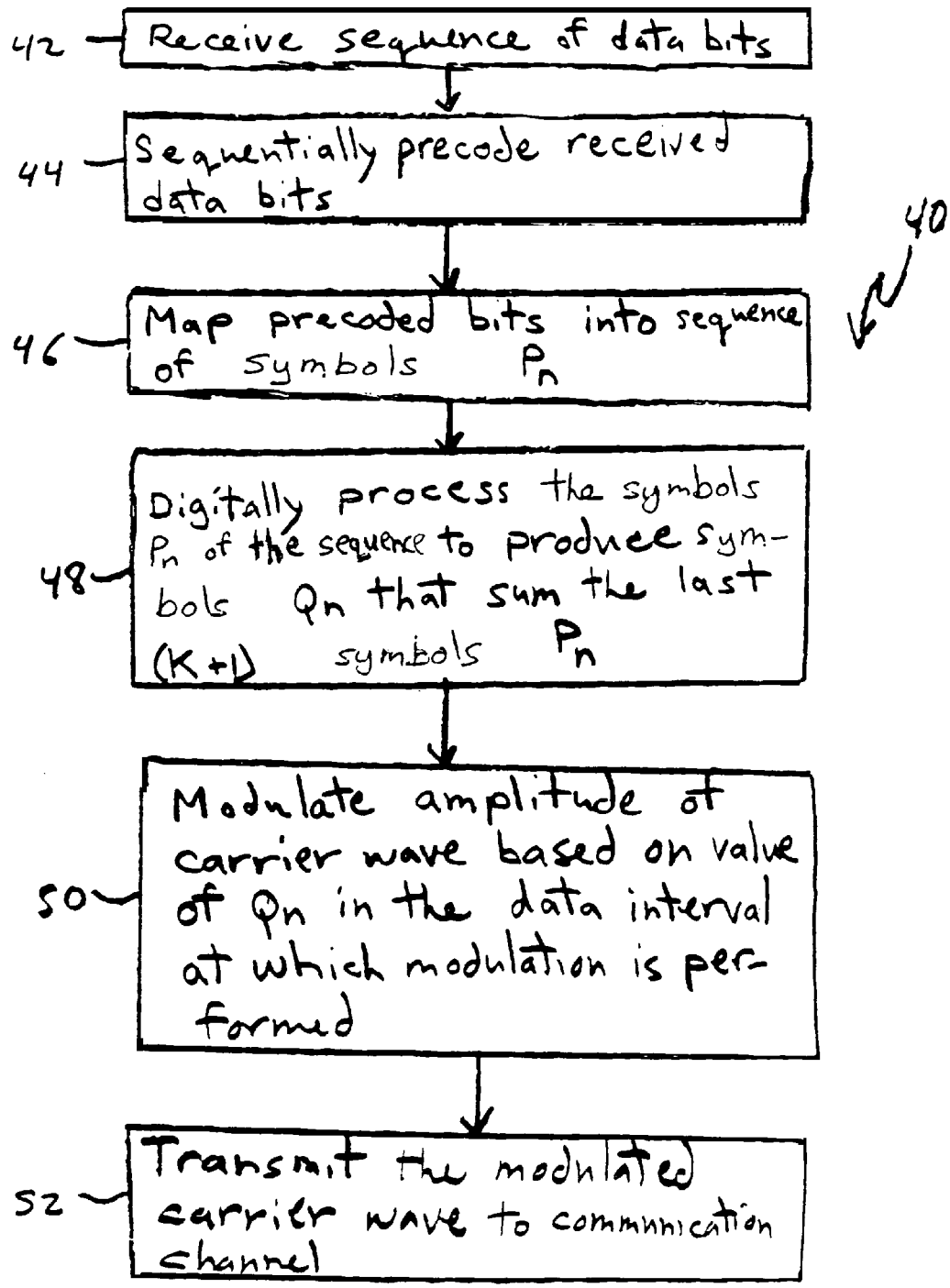
FIG. 2 is a flow chart of a process for transmitting data to a communication channel shown in FIG. 1.

FIG. 2 is a flow chart for a process 40 used by transmitter 12 to send digital data over channel 16 of FIG. 1. The transmitter 12 receives a stream of input data bits, $a_n$, at input port 34 of precoder 22 (step 42). The input bits $a_n$ have values logic 1 or logic 0. The precoder 22 precodes the input bits $a_n$ sequentially to produce a stream of output bits $b_n$ (step 44). The precoder 22 uses the following precoding algorithm: $b_n = b_{n-K} \oplus b_{n-K+1} \oplus \ldots \oplus b_{n-1} \oplus a_n$. Here, $\oplus$ indicates a logical exclusive-OR operation, and the subscripts "n, n−1, . . . n−K", etc. indicate the order in the signaling interval.

The precoding simplifies subsequent processing of received signals at receiver 14. The integer K, which characterizes the above-described preceding algorithm, is matched to the type of digital filtering performed by modulator 20. The construction of a precoder 22 capable of performing such a preceding algorithm would be known to those of skill in the art in light of the present disclosure.

Precoder 22 sequentially sends precoded data values $b_n$, to constellation mapper 23. The constellation mapper 23 produces symbols $P_n$ that correspond to the $b_n$ (step 46). The symbols $P_n$ belong to a 2-symbol constellation whose symbols have amplitudes +A/2 and −A/2. For $b_n$ equal to 0 and 1, the corresponding symbols are −A/2 and +A/2, respectively.

Constellation mapper 23 sequentially sends symbols $P_n$ to digital filter 24. The digital filter 24 produces an output stream of control symbols $Q_n$ by sequentially processing the symbols $P_n$ with a partial response function defined by $1+\Sigma_{i=1}^{K} Z^{-i}$ (step 48). Here, the $Z^{-i}$ are operators that produce delays of "i" times the signaling interval, i.e., the time between receipt of successive input bits $a_n$, when operating on symbols $P_n$. Thus, $Z^{-i}(P_n)=P_{n-i}$. The control symbol $Q_n$ is a sum of the present symbol $P_n$ plus the previous K symbols, i.e., $P_{n-1}, P_{n-2} \ldots P_{n-K}$. The control symbols $Q_n$ have values belonging to the transmitter constellation {−(K+1)A/2, −(K+1)A/2+A, −(K+1)A/2+2A, . . . , +(K+1)A/2}.

The integer K characterizes the form of digital filter 24 and the bandwidth of the modulated carrier wave produced by modulator 20. In the embodiments, K is a positive integer that is greater than one.

Digital filter 24 sends control symbols $Q_n$ to NRZ modulator 25. The NRZ modulator 25 amplitude modulates a carrier wave produced by source 18 with a NRZ waveform representative of the sequence of control symbols $Q_n$ received from the digital filter 24 (step 50). During each data interval "n", the amplitude of the modulated carrier wave corresponds to the present value of control symbol $Q_n$. Negative values of $Q_n$ correspond to carrier waves with amplitude $|Q_n|$ and a phase shifted by 180°. The modulator 20 transmits the modulated carrier wave to communication channel 16 (step 52).

Processing symbols $P_n$ with digital filter 24 and then, NRZ modulating a carrier with the processed control symbols $Q_n$ produces a modulated carrier wave. The resultant modulated carrier wave has a bandwidth that is narrower than that of a carrier wave produced by directly NRZ modulating the original carrier wave with the control symbols $P_n$ (or $P_n$ shifted by an amount A/2).

To understand the origin of the spectral narrowing, it should be noted that modulator 20 has alternate but, equivalent descriptions. Above, a serial description was provided for the modulator 20. In the serial description, successive symbols $Q_n$ serially define the modulation amplitude of the carrier wave during modulation periods whose lengths are equal to a time "T". The time "T" is the signaling interval between receipt of successive input data bits $a_n$. Alternately, a parallel description is available for the modulator 20. In the parallel description, successive symbols $P_n$ define the modulation amplitude of a copy of the carrier wave during periods whose lengths are equal to (K+1)T. Thus, the parallel description of the modulator 20 involves modulation intervals that are (K+1) times as long as the modulation intervals in the serial description.

While the input digital data for the system 10 of FIG. 1 is a stream of single data bits $a_n$, other embodiments use input data values $a_n$ that carry multiple bits of digital data. In those embodiments, each value of $b_n$, carries multiple bits of digital data, and each symbol $P_n$ is representative of such multiple-bit data. Similarly, in those embodiments, the transmission constellation of symbols $Q_n$ correspond to sums of multiple-bit digital data.

While digital filter 24 and NRZ modulator 25 of FIG. 1 directly correspond to components performing actions in the serial description, the parallel description is functionally equivalent. Furthermore, the parallel description shows clearly why the bandwidth of the modulated carrier wave is narrower, because the modulation interval in the parallel description is (K+1) times the nominal modulation interval in the serial description.

Figure 3:
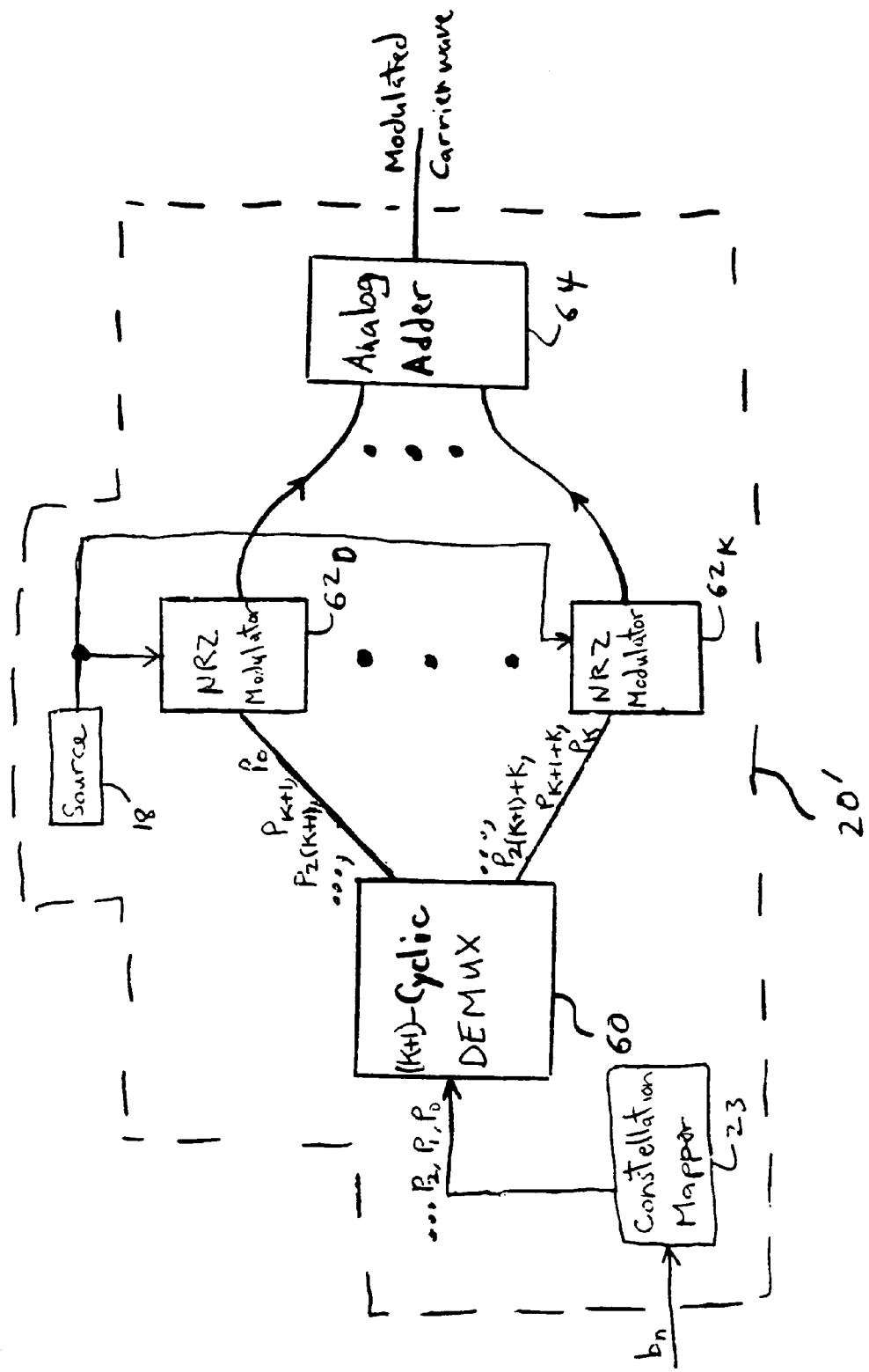
FIG. 3 is block diagram of a modulator functionally equivalent to a modulator shown in FIG. 1.

FIG. 3 shows a modulator 20' whose components function according to the equivalent parallel description of modulator 20 of FIG. 1. The modulator 20' includes a (K+1)-cyclic demultiplexer (DEMUX) 60 that receives a sequence of symbols $P_0, P_1, P_2, \ldots$ from constellation mapper 23. The DEMUX 60 cyclically distributes the received symbols to a parallel bank of (K+1) NRZ modulators $62_0$–$62_K$. The modulator $62_0$ receives symbol $P_0$ in a first signal interval, the modulator $62_1$ receives symbol $P_1$ in the next signal interval, etc.

The modulators $62_0$–$62_K$ also have an input for receiving a copy of the carrier wave produced by source 18 of FIG. 1. The various copies of the carrier wave do not have relative phase differences.

While the time between successive input symbols of DEMUX 60 is again equal to the time T between receipt of successive input data bits $a_n$, the time between successive input symbols for each NRZ modulator $62_m$ is (K+1)T. Until receipt of a new input symbol, each modulator $62_m$ continues to modulate the carrier wave with the same amplitude. Thus, the modulators $62_0$–$62_K$ produce optical signals with constant amplitudes during temporal periods that are (K+1)T. From the modulators $62_0$–$62_K$, modulated optical signals go to an analog signal adder 64 that superimposes the individual modulated signals and transmits the result to channel 16.

Since the wave transmitted by adder 64 is a simple summation of the signals produced by individual modulators $62_0$–$62_K$, the spectral content of the transmitted wave is determined by the spectral content of the signals produced by those modulators $62_0$–$62_K$. This follows because a Fourier transform of a sum is simply the sum of the Fourier transforms of the individual signals being summed.

Since each symbol $P_n$ modulates a copy of the carrier wave for a time (K+1)T, modulators $62_0$–$62_K$ have effective symbol rates of 1/[(K+1)T]. Thus, the effective symbol rate in the modulator 20', or equivalently, in modulator 20 is 1/[(K+1)T].

Figure 4:
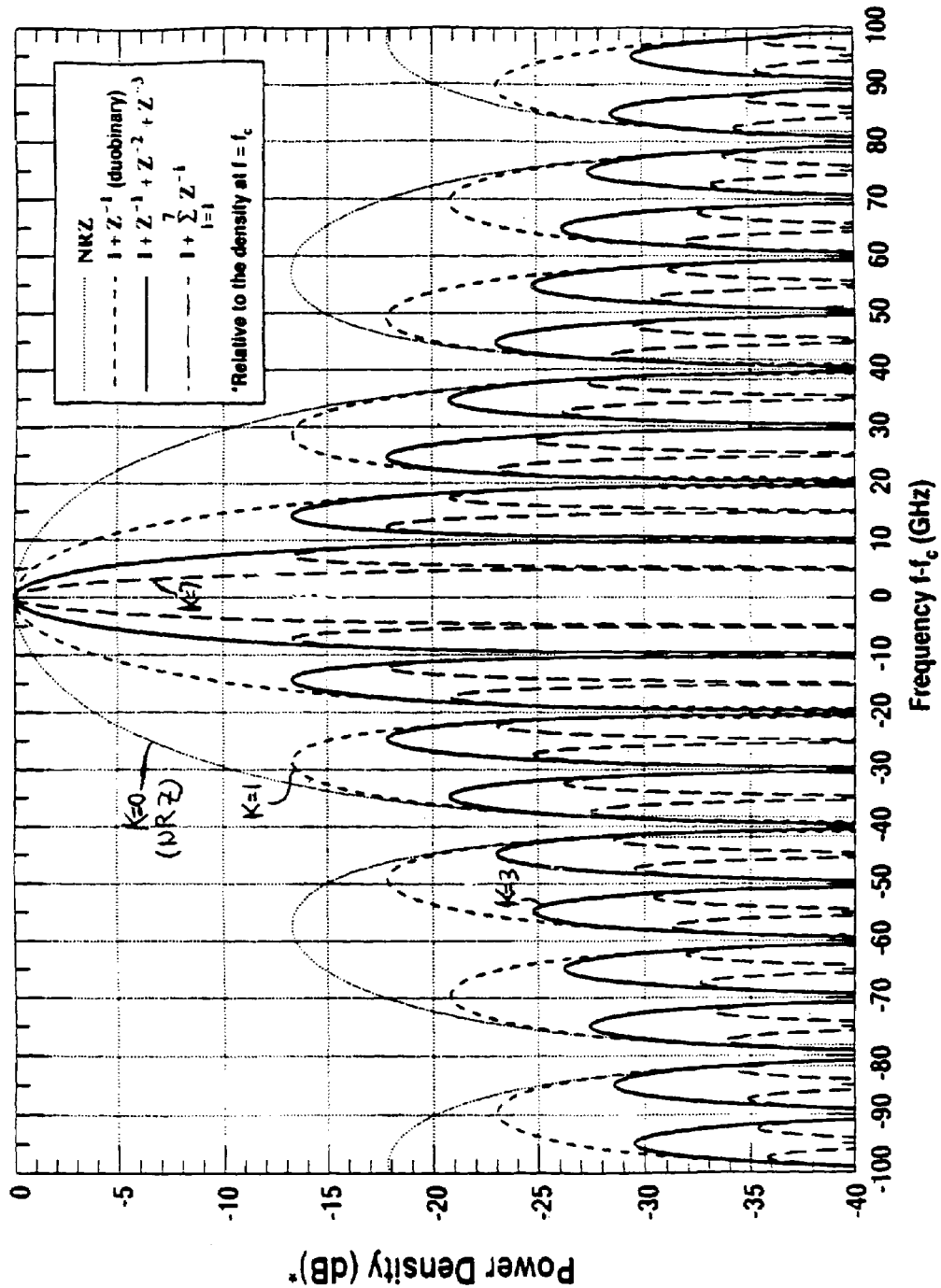
FIG. 4 shows power spectra of signals produced by modulators of types shown in FIG. 1.

FIG. 4 shows spectra of carrier waves generated by modulator 20 or 20' for various of the integer K characterizing these modulators, i.e., K=0, 1, 3, and 7. The data rate is 40 Giga-bits-per-second, i.e., T=0.025 nanoseconds. The modulated carrier wave has power density, W(K), given by:

$$W(K) \propto [\sin[\pi(K+1)T(f-f_c)]/[\pi(f-f_c)]]^2.$$

This power density function has zeros on each side of a central peak at the carrier frequency $f_c$. The distance between these zeros is equal to 2/[(K+1)T], i.e., is inversely proportional to the number of modulators $62_0$–$62_K$ in the parallel array shown in FIG. 3.

The distance between power zeros adjacent carrier frequency $f_c$ measures the bandwidth of the power spectrum. The bandwidth of an output signal from modulator 20' is approximately proportional to $(K+1)^{-1}$, i.e., the bandwidth of the modulators $62_0$–$62_K$, because signals produced by the individual modulators $62_0$–$62_K$ are summed to produce the output signal from modulator 20'. Thus, both modulator 20' and modulator 20 produce carrier waves that are spectrally narrower by a factor of $(K+1)^{-1}$ than conventionally NRZ modulated carrier waves carrying the same amount of data.

This bandwidth narrowing is helpful in reducing cross-channel-interference (CCI) in optical WDM systems, because the narrowing reduces signal overlaps between adjacent wavelength channels. The reduction to CCI is achieved by introducing severe intersymbol interference among successive symbols $P_n$, which can, however, be easily eliminated in the receiver as explained below.

Figure 5:
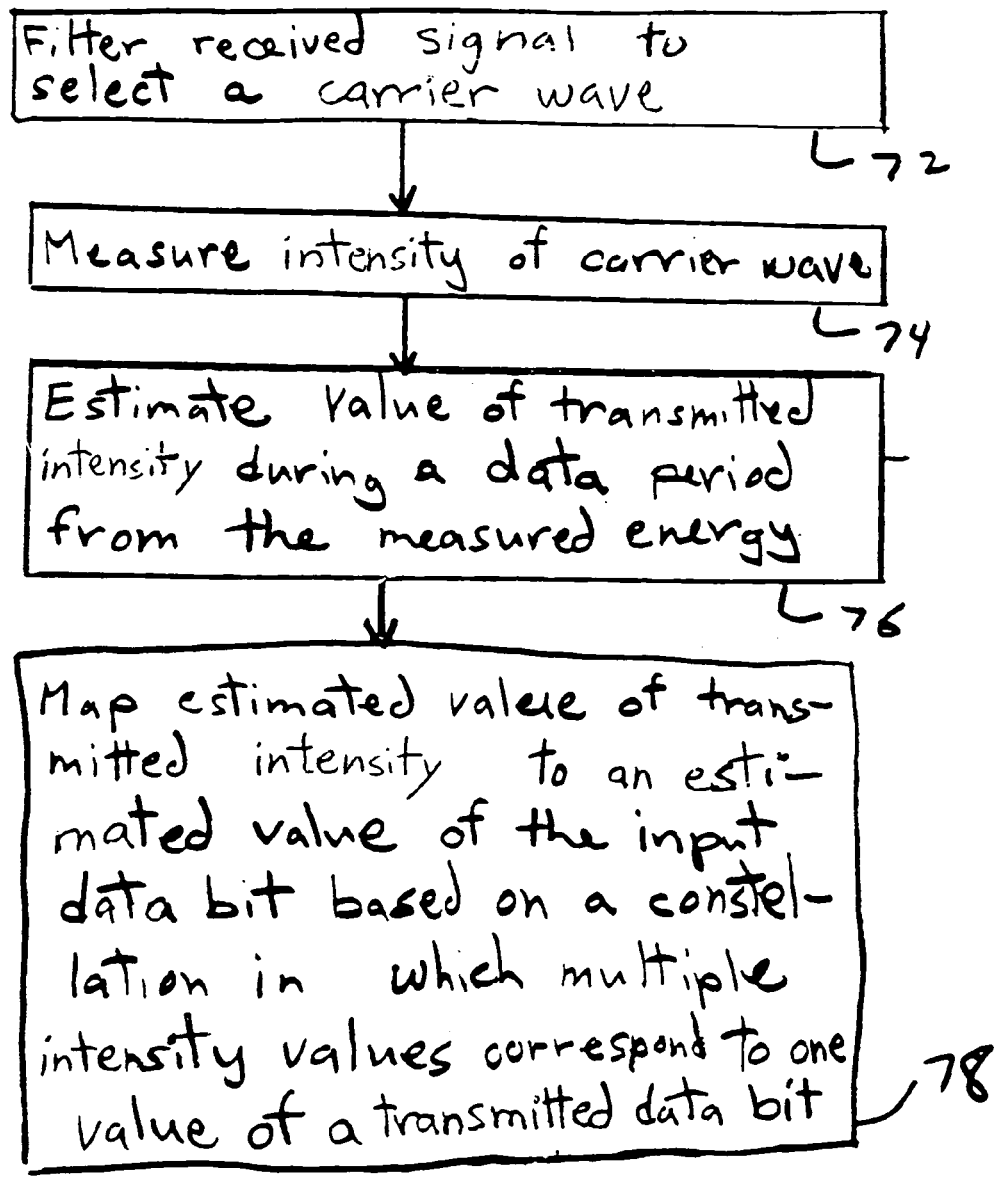
FIG. 5 is a flow chart for a process of extracting data from signals received from the communication channel of FIG. 1.

FIG. 5 is a flow chart for a process 70 used by receiver 14 of FIG. 1 to extract a stream of estimated data bits $â_n$ from the carrier wave received from channel 16. The received signal passes through bandpass filter 33, which selects a carrier wave, e.g., one channel of a WDM system (step 72). For each nth signaling interval, the detector 32 measures the instantaneous intensity of the carrier wave and sends the measured value of the intensity $M(Q_n^2)$ to slicer 28 (step 74). The measured intensity may, e.g., be the instantaneous energy of the carrier wave.

From the value of $M(Q_n^2)$, the slicer 28 estimates the intensity $Q_n^2$ of the originally transmitted carrier wave for the data interval associated with $a_n$ and sends the estimated value $E(Q_n^2)$ to inverse constellation mapper 30 (step 76). For the constellation of transmission symbols of transmitter 12 with K being an odd integer, i.e., K=3, 5, 7 . . . , intensities $Q_n^2$ of the transmission symbols have intensities belonging to the constellation $\{[(K+1)A/2]^2, [(K+1)A/2-A]^2, [(K+1)A/2-2A]^2, \ldots, 0\}$. The slicer 28 determines each estimated value $E(Q_n^2)$ by comparing the measured intensity $M(Q_n^2)$ with a preselected set of threshold values. The threshold values define upper and lower limits for the received intensities to be associated with each of the transmitted intensity values $Q_n^2$. The values of the thresholds vary for different embodiments of communication channel 16, because channel impairment and noise differ from channel to channel. The slicer 28 sends estimated values of the intensities $E(Q_n^2)$ to inverse constellation mapper 30 serially and at the original rate for receiving input data bits $a_n$ in the transmitter 12.

From a received value of $E(Q_n^2)$, inverse constellation mapper 30 maps the value $E(Q_n^2)$ to a value $â_n$ (step 78). The value of $â_n$, which is the output data from receiver 14, is an estimation of the originally transmitted data bit $a_n$ that generated $Q_n$. Thus, the inverse mapping eliminates the intersymbol interference that was introduced by the transmitter 12 to reduce the bandwidth of the modulated carrier wave.

The receiver 14 repeats steps 72, 74, 76, and 78 during successive signaling intervals to reconstruct the output sequence of estimated data bits $â_n$ corresponding to the sequence of input data bits $a_n$ received by transmitter 12.

This inverse mapping is based on a constellation in which several values of $Q_n^2$ correspond to the same $a_n$. The form of the relation between $Q_n^2$ values and $a_n$ values, which is used by inverse constellation mapper 30, follows from the form of transmitter 12. In particular, the inverse mapping is defined by two relations. The first relation states that if $Q^{n2}=[(K+1)A/2-2LA]^2$ with L equal to an integer, then $a_n$ equals zero. The second relation states that if $Q^{n2}=[(K+1)A/2-(2L+1)A]^2$ with L equal to an integer, then $a_n$ equals one. The inverse constellation mapper 30 simply reads the value of $â_n$ from the value of $E(Q_n^2)$ and the above two relations.

Figure 6:
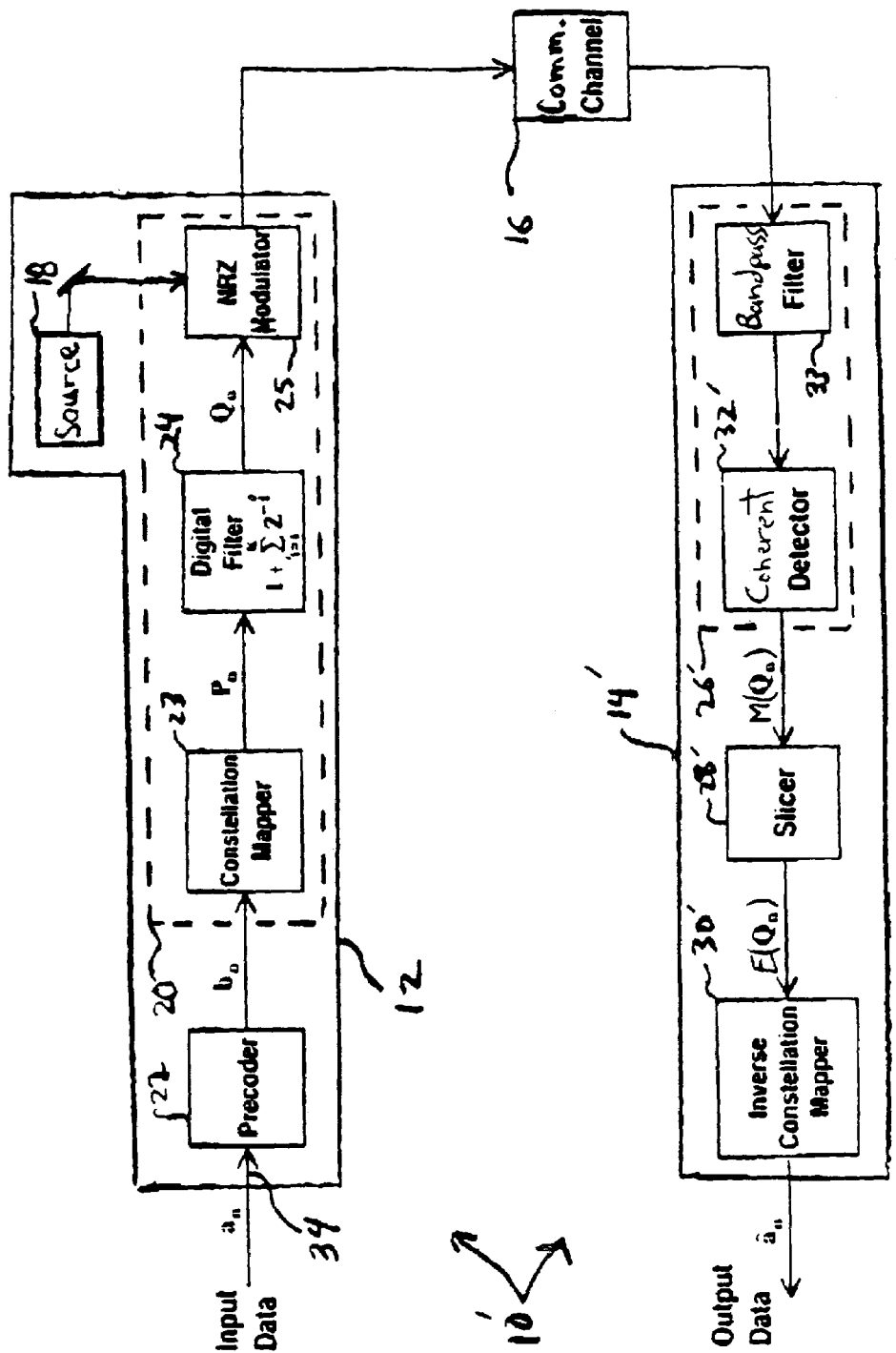
FIG. 6 shows an alternate receiver for use in the communication system of FIG. 1.

FIG. 6 shows an embodiment 10' of communication system 10 of FIG. 1 in which the value of K characterizing transmitter 12 is equal to an even integer, i.e., 2, 4, 6, . . . In the system 10', receiver 14' includes a coherent detector 32' whose output signal $M(Q_n)$ is a measured value of both the magnitude and sign of $Q_n$.

Figure 7:
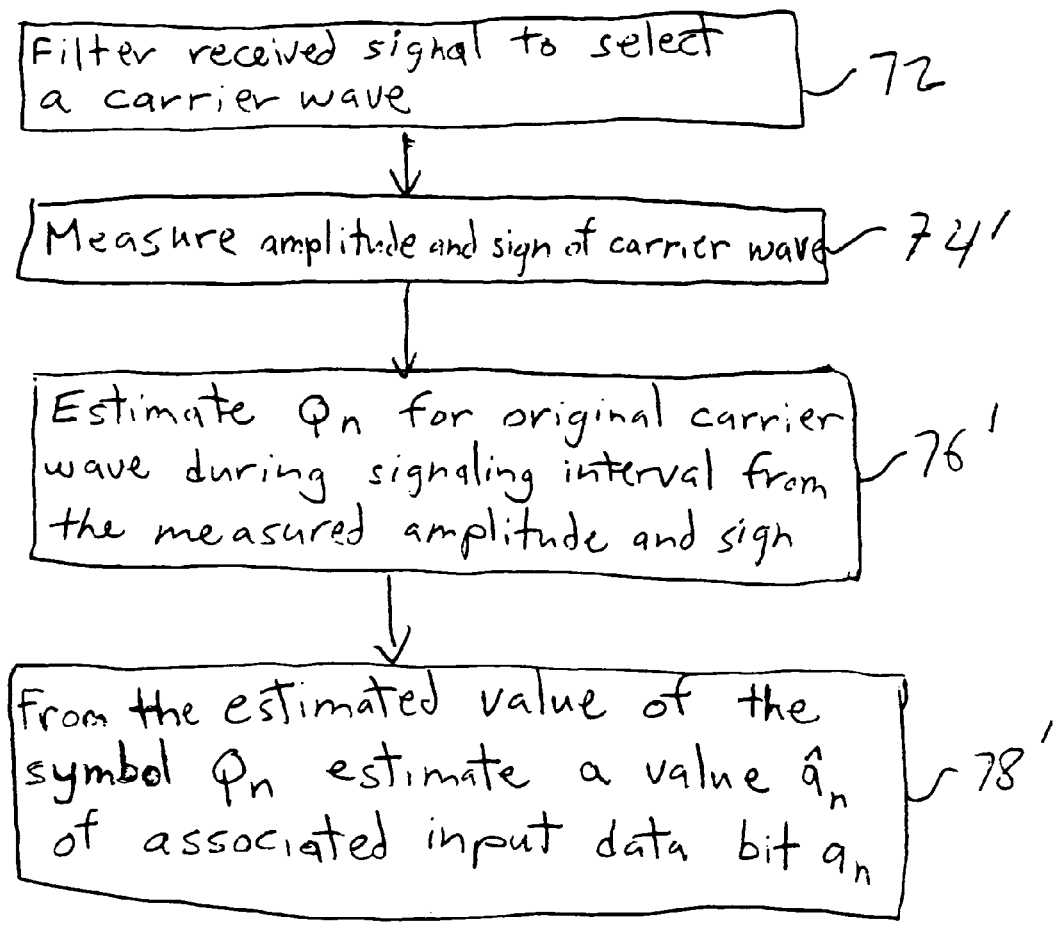
FIG. 7 is a flow chart for a process by which the receiver of FIG. 6 extracts data from received signals.

FIG. 7 is a flow chart for a process 70' used by receiver 14' of FIG. 6 to extract a stream of estimated data bits $â_n$ from the carrier wave received from channel 16. In this case, detector 32' measures $M(Q_n)$, which provides both the amplitude and the phase (i.e., a sign) of the received carrier wave in each signaling interval (step 74'). From the value of $M(Q_n)$, the slicer 28' estimates $Q_n$ of the originally transmitted carrier wave for the data interval associated with $a_n$ and sends the estimated value $E(Q_n)$ to inverse constellation mapper 30' (step 76'). For the transmitter 12, the $Q_n$ for transmission symbols belong to the constellation $\{-(K+1)A/2, (K+1)A/2+A, (K+1)A/2+2A, \ldots, +(K+1)A/2\}$. The slicer 28' determines each estimated value $E(Q_n)$ by comparing the measured signal $M(Q_n)$ with a preselected set of threshold values. The threshold values define upper and lower limits for the received signal to be associated with each of the transmitted values $Q_n$. The values of the thresholds vary for different embodiments of communication channel 16. The slicer 28' sends estimated values of the $E(Q_n)$ to inverse constellation mapper 30' serially and at the original rate for receiving input data bits an in the transmitter 12.

From a received value of $E(Q_n)$, inverse constellation mapper 30' maps the value $E(Q_n)$ to a value $\hat{a}_n$ (step 78'). The value of $\hat{a}_n$, which is the output data from receiver 14', is an estimation of the originally transmitted data bit $a_n$ that generated $Q_n$. Thus, the inverse mapping again eliminates the intersymbol interference that was introduced by the transmitter 12 to reduce the bandwidth of the modulated carrier wave.

This inverse mapping is based on a constellation in which several values of $Q_n$ correspond to the same $a_n$. In particular, the inverse mapping is defined by two relations. The first relation states that if $Q_n = -(K+1)A/2 + 2LA$ with L equal to an integer, then $a_n$ equals zero. The second relation states that if $Q_n = -(K+1)A/2 + (2L+1)A$ with L equal to an integer, then $a_n$ equals one. The inverse constellation mapper 30' reads the value of $\hat{a}_n$ from the value of $E(Q_n)$ and the above two relations.

The above relations between $Q_n^2$ and $a_n$ when K is an odd integer and between $Q_n$ and $a_n$ when K is an even integer follow from relations between symbols $Q_n$ of the transmitter constellation and the input data bits $a_n$. Note that since $b_n = b_{n-K} \oplus b_{n-K+1} \oplus \ldots \oplus b_{n-1} \oplus a_n$ in precoder 22, it follows that $a_n = b_{n-K} \oplus b_{n-K+1} \oplus \ldots \oplus b_{n-1} \oplus b_n$. For integers $m = n-K, n-K+1, \ldots, n-1, n$, each $b_m$ selects a value of $P_m$ in constellation mapper 23. The value of $P_m$ is equal to $-A/2$ if $b_m = 0$ and is equal to $+A/2$ if $b_m = 1$. It follows for each even or odd integer K that transmission symbols satisfy $Q_n = -(K+1)A/2 + 2LA$ if $a_n$ is zero and satisfy $Q_n = -(K+1)A/2 + (2L+1)A$ if $a_n$ is one. For K odd, the above relations on the constellation of transmission symbols simplify, because both $Q_n$ and $-Q_n$ map to the same value of $a_n$.

Figure 8:
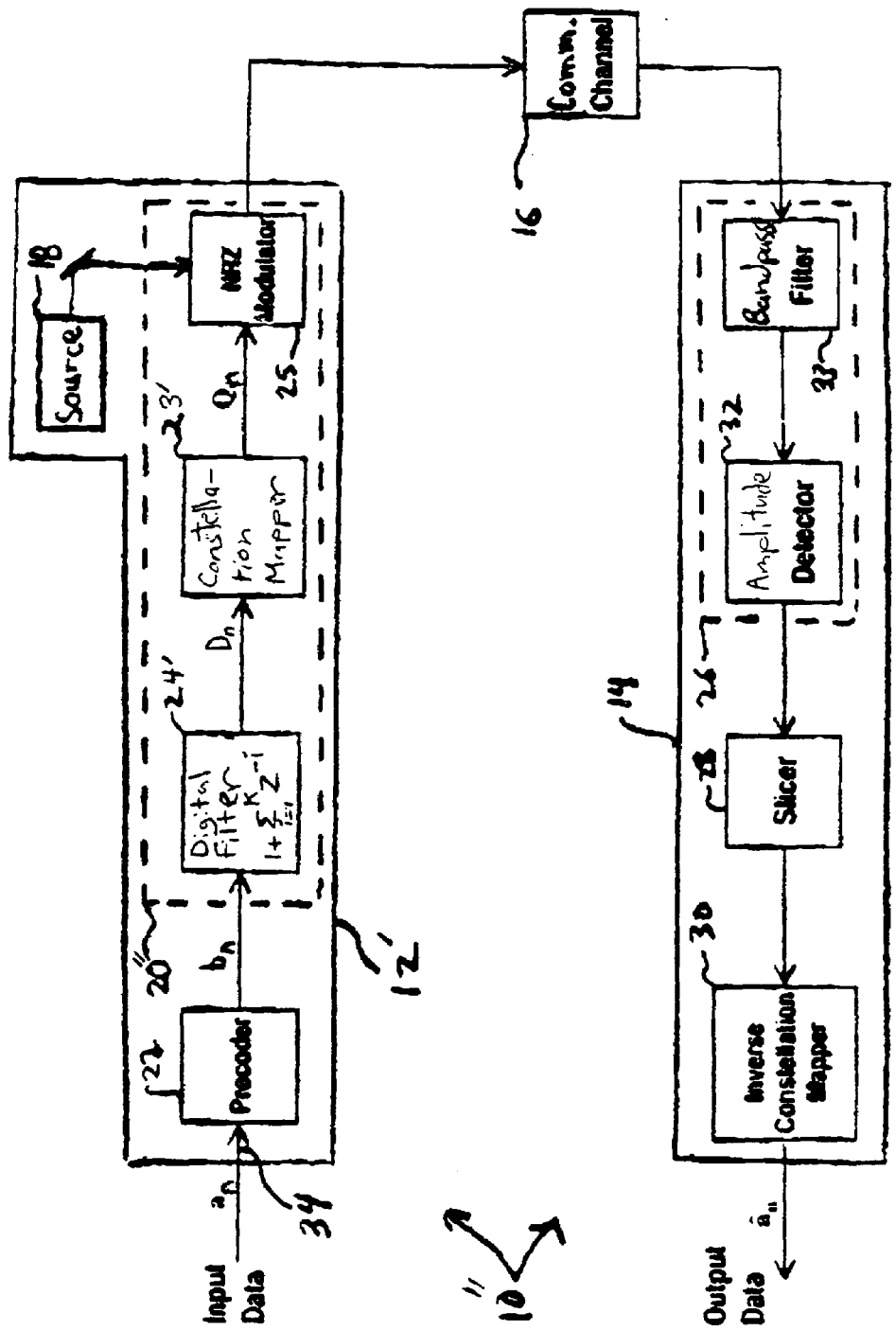
FIG. 8 shows an alternate transmitter for use in the communication system of FIG. 1.

FIG. 8 shows an alternate but functionally equivalent transmitter 12' for the communication system 10 of FIG. 1. In the transmitter 12', digital filter 24' forms a sum $D_n$ of the present bit $b_n$, and the K previous bits $b_{n-K}, b_{n-K+1}, \ldots, b_{n-1}$ received from precoder 22 and transmits the sum to constellation mapper 23'. The constellation mapper 23' maps the (K+2) possible $D_n$ values $0, 1, 2, \ldots, K+1$ into respective values $-(K+1)A/2, -(K+1)A/2+A, -(K+1)A/2+2A, \ldots, (K+1)A/2\}$ from a (K+2) symbol constellation for $Q_n$. The sequence of symbols $Q_n$ provides a waveform used to modulate a carrier wave in NRZ modulator 25 as already described for the transmitter 12 of FIGS. 1 and 2.

Though the above-described embodiments include precoder 22 and a special precoder algorithm, the invention is not limited to a transmitter 12 with the precoder 22 of FIG. 1. The above-described precoder 22 simplifies the receiver operations. Embodiments without precoder 22 would use a different algorithm to obtain estimated data bit values $\hat{a}_n$ from the measured values $M(Q_n^2)$ or $M(Q_n)$ for the received signal.

FIG. 9 is a table that shows transmission bandwidths and receiver sensitivities for several choices of the integer K that characterizes digital filter 24 of FIG. 1. In the table, the receiver sensitivities are defined as the ratio of the minimum squared distance between transmitter symbols $Q_n$ in the constellation divided by the average intensity, i.e., $Q_n^2$, of the transmitter symbols $Q_n$ in the constellation. For a given data rate, one can keep reducing the signal bandwidth by 50% by using a larger value for K and by paying a cost of 3 dB in the receiver sensitivity. For example, this is the case when K is increased from 1 to 3, from 3 to 5, or from 7 to 15 in the table. Equivalently, for a given signal bandwidth, one can keep doubling the data rate by using a larger value for K and by paying a cost of 6 dB in the receiver sensitivity. The cost is 3 dB higher than earlier, because doubling the data rate reduces the energy for each bit by half. This should be compared with a conventional modulator that performs plain pulse amplitude modulation. For such a modulator increasing the data transmission rate by about one bit-per-Hertz costs about 6 dB in receiver sensitivity. Thus, the new modulator 20 is much more efficient than the conventional modulator. For example, the new modulator 20 should be advantageous for future optical communication systems that will have data rates in excess of 10 Giga-bits-per-second.

Referring again to FIG. 1, to improve receiver sensitivity, some embodiments of receiver 14 use a Viterbi decoder to obtain estimated values of $\hat{a}_n$ directly from the measured signal values of $M(Q_n^2)$ or $M(Q_n)$. Since the use of a Viterbi decoder requires processing received signal at the full symbol rate, these embodiments are less practical when symbol rates approach 10 Giga-bits-per-second and higher.

Other embodiments use error correction codes to improve receiver sensitivity. Error correction codes do not require processing received signals at full symbol rates. Instead, a bank of encoders can be operated in parallel in transmitter 12 and a bank of decoders can be operated in parallel in receiver 14. Error correction codes compatible with system 10 and 10' of FIGS. 1 and 6 include Reed-Solomon codes, low-redundancy punctured convolutional codes, and concatenations of these codes.

In various embodiments, modulator 20 modulates the carrier wave with both positive and negative modulation amplitudes $Q_n$, i.e., the negative modulation amplitudes introduce a 180° phase shift. By using both positive and negative modulation amplitudes, average signal intensities in channel 16 can be kept lower. In an optical communications channel, the lower intensities reduce nonlinear effects that interfere with transmission.

Other embodiments of modulator 20 only use positive modulation amplitudes to modulate the carrier wave.

Other embodiments of the invention will be apparent to those skilled in the art in light of the specification, drawings, and claims of this application.

What is claimed is:

1. A receiver, comprising:
   a detector to receive a modulated carrier signal from a transmitter; and
   a mapper configured to use the received signal to determine values of input digital data values associated with a stream of input symbols that the transmitter used to modulate the carrier signal, the carrier signal being modulated by a stream of control symbols formed by processing the stream of input digital data values with a partial response function defined by $[1+\Sigma_{i=1}^{K} Z^{-i}]$, the integer K being greater than one, and the functions $Z^{-i}$ delaying the input digital data values by i multiplied by the time between successive ones of the input digital data values.

2. The receiver of claim 1, wherein the detector determines optical intensities.

3. The receiver of claim 1, wherein the mapper includes an inverse constellation mapper based on a constellation of transmission symbols in which at least two of the transmission symbols correspond to the same value for ones of the input data values.

4. The receiver of claim 1, wherein the input digital data values are data bits.

5. The receiver of claim 1, wherein the receiver is configured to demodulate a carrier signal that is amplitude modulated with a non-return-to-zero waveform whose amplitude is representative of a sequence of symbols, the symbols having positive and negative amplitudes, the modulated carrier signal being phase shifted where modulated with ones of the symbols having amplitudes of one sign.

6. The receiver of claim 5, wherein the detector determines optical intensities.

7. The receiver of claim 5, wherein the mapper includes an inverse constellation mapper based on a constellation of transmission symbols in which at least two of the transmission symbols correspond to the same value for one of the input digital data values.

8. The receiver of claim 5, wherein the input digital data values are data bits.

9. A receiver, comprising:
   an amplitude detector to receive a carrier wave and to determine a sequence of values representative of intensities of the received carrier wave;
   a slicer to determine a transmission intensity of the carrier wave corresponding to each value; and
   an inverse constellation mapper to estimate a sequence of input digital data values used to modulate the carrier wave based both on the determined transmission intensities and on a relation between the transmission intensities and the input digital data values, the relation associating at least two of the transmission intensities to the same one of the input digital data values.

10. The receiver of claim 9, further comprising:
    an optical filter to select a frequency band, the detector coupled to receive the carrier wave belonging to the selected frequency band from an output of the optical filter.

11. The receiver of claim 10, wherein the detector detects one of visible and near infrared light.

12. The receiver of claim 9, wherein the detector is configured to detect a carrier wave in a wireless channel.

13. The receiver of claim 9, wherein the input digital data values are data bits.

* * * * *